United States Patent [19]

Evans

[11] 4,332,267
[45] Jun. 1, 1982

[54] BALL VALVE ASSEMBLY

[75] Inventor: Robert W. Evans, Houston, Tex.

[73] Assignee: Baker International Corporation, Orange, Calif.

[21] Appl. No.: 141,523

[22] Filed: Apr. 18, 1980

Related U.S. Application Data

[62] Division of Ser. No. 42,257, May 24, 1979.

[51] Int. Cl.³ .............................................. E03B 1/00
[52] U.S. Cl. ...................................... 137/1; 251/159; 251/172; 251/174; 251/210; 166/130
[58] Field of Search ............... 251/315, 159, 174, 210, 251/172; 137/1; 166/130

[56] References Cited
U.S. PATENT DOCUMENTS

| | | | |
|---|---|---|---|
| 3,912,220 | 10/1975 | Vasicek | 251/159 |
| 4,215,722 | 8/1980 | Sigmon | 251/159 X |
| 4,280,522 | 7/1981 | Pechuyo | 251/174 X |

Primary Examiner—Harold W. Weakley
Attorney, Agent, or Firm—William C. Norvell, Jr.

[57] ABSTRACT

An improved mounting and sealing assembly is provided for a rotating ball valve required to open under increased differential pressures and close against high flow rates. The valve assembly includes a trunnion-mounted ball and two pressure biased sealing assemblies. The primary seal constitutes an elastomeric seal element which is axially shiftable into engagement with the ball, and the secondary seal comprises a metallic element which is also axially shiftable relative to the ball. To open the valve, the seals are moved in sequence axially away from the ball and the hydraulic seal is fully broken before the ball is rotated. In closing, the ball is rotated to its closed position and the seals then moved axially in sequence into contact with the ball.

2 Claims, 13 Drawing Figures

BALL VALVE ASSEMBLY

CROSS-REFERENCE TO RELATED APPLICATION

This application is a divisional application of my co-pending application Ser. No. 42,257, filed May 24, 1979, entitled "Ball Valve Assembly".

BACKGROUND OF THE INVENTION

1. Field of the Invention

This invention relates to an improved rotatable ball valve designed for operation under high differential pressures, such as are encountered in a downhole valve for an oil well.

2. Description of the Prior Art

Rotatable ball valves are well known in the valve art. In particular, there are prior art disclosures of a trunnion-mounted ball valve which cooperates with a pressure-biased seal seat which seals on the upstream side of the ball. In this type of valve, the thrust of the ball is carried by the trunnion bearings, thereby reducing the load on the seal seat. However, when this type of ball valve is opened, a large differential pressure across the ball valve will subject the rotating mechanism to damage due to large frictional resistance to rotation exerted by the seal, and also exposes the ball seal to tearing, extrusion or fluid erosion. As the ball rotates from the closed to the open position and the edge of the valve port in the ball passes the seal surface of the valve seat (i.e., the valve has just "cracked" open), a small portion of the valve seat is exposed to flow velocity great enough to quickly damage the hardest of materials. A similar high velocity flow occurs on closing the valve.

To overcome these deleterious effects, a prior art construction has provided a trunnion-mounted ball having an elastomeric ball seat but providing a mechanism wherein each opening movement of the valve rotates the ball seat several degrees each time the ball is closed. This does not eliminate the valve seat damage caused by erosive high velocity fluid during opening or closing, but it does expose a new section of the seat to the high velocity flow each time the ball is opened and closed, and extends the seal life by distributing the wear around the entire seal. Such mechanism does not, of course, have any reducing effect on the torque required to rotate the ball.

Another example of the prior art is a conventional subsurface safety valve. This valve has an elastomeric primary seal and an adjacent secondary metal seal, but it is a floating ball type valve, and hence, the thrust of the ball is carried by the ball seats. The feature of this valve is that the metallic ball seat is actuated to move the ball away from the elastomeric primary seal before rotation of the ball is initiated. This necessarily means that the ball is rotated while in contact with the metal seal. This construction thus requires some apparatus for achieving an equalization of the pressure differential across the ball valve before attempting to rotate the ball against the metallic ball seat, or damage to the rotating mechanism from excessive torque and to the ball seat by fluid erosion will occur.

SUMMARY OF THE INVENTION

It is, accordingly, an object of this invention to provide an improved rotating ball valve assembly to permit long life, minimum torque operation of the valve under high pressure differentials.

This invention contemplates employing a trunnion-mounted valve which cooperates with two ball seats, each of which is axially movable into engagement with the ball. One such seat incorporates a pressure-biased elastomeric primary seal and the other such seat provides a pressure-biased metallic secondary seal. Both seats are moved axially away from the ball, with the elastomeric seal being moved first, and the hydraulic seal is broken before the ball begins to rotate. In other words, the valve opens like a face seal. This greatly reduces the rotating torque since the only resistance to rotation is due to flow dynamics. Upon closing of the improved ball valve construction, the opposite occurs. The ball first rotates to its closed position and the two seats then move axially in sequence into sealing contact with the ball.

In accordance with the preferred embodiment of this invention, the above recited sequence of operation of the ball seals and the ball is accomplished by the axial movement of a single actuating element. While a number of mechanical expedients can be employed for achieving the axial movement of the actuating element, in the preferred embodiment of this invention, such axial movement is produced by relative axial movement of the entire housing of the valve with respect to a stationary member fixedly mounted to the well production tubing, or the like, and having a mandrel entering the bottom end of the housing to engage the actuator. A rotational movement of the housing through a limited number of degrees can then be employed to achieve the locking of the housing in its down or valve opening position.

In accordance with a modification of the invention, an annular return piston is mounted within the valve housing which is effective to achieve the opening of the ball valve in the proper sequence relative to the annular seals under emergency conditions where the fluid pressure on the valve can be reversed from that which the valve normally operates against. Such annular piston is subjected to a differential pressure urging it toward the ball when the reversed pressure condition occurs and it holds the secondary metal seal in engagement with the ball until pressure builds up sufficiently to move the elastomeric seal axially out of engagement with the ball valve, thus permitting the opening of the ball without subjecting the elastomeric seal to any erosive effects.

Other objects and advantages of the invention will be apparent to those skilled in the art from the following detailed description.

BRIEF DESCRIPTION OF THE DRAWINGS

FIG. 6 is an enlarged scale, partial sectional view of the ball sealing elements of FIG. 2a.

DESCRIPTION OF THE PREFERRED EMBODIMENTS

The schematic views of a rotary ball valve incorporating this invention shown in FIGS. 1a, 1b, 1c and 1d, will provide a clear understanding of the basic principles involved in the method and apparatus of this invention, following which a description of a preferred embodiment of the invention represented by FIGS. 2 through 5 will be presented.

Figure 1A:
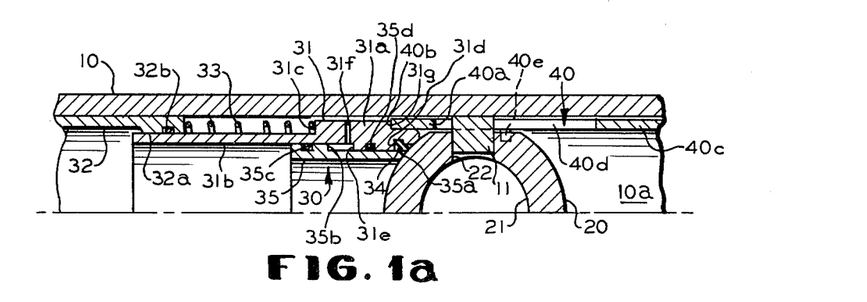
FIG. 1a is a schematic sectional view of a rotary ball valve assembly incorporating this invention, showing the seal elements of the valve in the closed position.

A generally tubular housing 10 is provided, defining a generally cylindrical fluid passage 10a which is opened or closed by rotation of a ball 20. The ball 20 has a fluid passage 21 extending therethrough which, in the open position of the ball 20, is coaxially aligned with the housing passage 10a. In the closed position of the ball 20, the ball passage 21 has its axis disposed normal to the axis of the housing 10.

Ball 20 is mounted for limited angular rotation within the housing 10 by a pair of opposed trunnion bearings 11 which are appropriately mounted in a fixed position within the housing 10 in diametrically opposed relationship. Trunnions 11 are respectively received in diametrically opposed coaxial holes 22 provided in the ball 20. The axis of the holes 22 is, of course, perpendicular of the axis of the ball fluid passage 21. Thus 90° rotation of the ball 20 within the fluid passage 10a is conveniently permitted and the ball 20 is shiftable by a 90° rotation between its open and closed position with respect to the fluid passage 10a.

In FIG. 1a, the ball is illustrated as being in its closed position with the axis of the ball fluid passage 21 being disposed in perpendicular relationship to the axis of the fluid passage 10a. In this closed position, it is necessary to prevent fluid leakage from the pressurized or upstream side of the ball 20 around the trunnion bearings 11 and to accomplish such sealing, a composite sealing structure 30 is provided which is of generally annular configuration and is slidably concentrically mounted within the housing 10 for axial movements relative thereto, between a sealing position wherein the sealing structure 30 is in engagement with the surface of the ball 20 (FIG. 1a) to a retracted position where no contact is provided between sealing structure 30 and the surface of the ball 20 (FIG. 1d).

The sealing structure 30 includes a primary annular seal support element 31 having a radially thickened portion 31a adjacent to the ball 20 and a tubular, axially extending portion 31b which slidably engages an internal cylindrical surface 32a of a bearing 32 which is appropriately mounted in the housing 10. A seal 32b cooperates with the external cylindrical surface of extension 31b to prevent fluid leakage at this point. A spring 33 extends between the side wall of bearing 32 and a radial surface 31c defined by the thickened end portion 31a. Spring 33 normally urges the seal structure 31 axially toward a position of engagement with ball valve 20.

On the inner end of the thickened portion 31a of the seal structure 31, an L-shaped cross-section groove 31d is provided to receive a correspondingly shaped ring 34 of elastomeric material which achieves a sealing engagement with the ball 20 when the primary seal support 31 is shifted axially toward the ball 20.

The elastomeric seal ring 34 is retained within the slot 31d by a concentrically mounted tubular secondary seal 35. The seal 35 has a metallic end face 35a adapted to also engage the surface of the ball 20 in sealing relationship when the primary seal support 31 is in its axial sealing position. However, a lost motion connection defined by an external shoulder 35b on secondary seal element 35 and a shoulder 31e provided on the primary seal support 31 permits the primary seal support 31 to move the elastomeric seal 34 axially out of engagement with the ball 20 without disturbing the sealing engagement of the sealing face 35a of the secondary seal 35 with the ball.

It will be noted that fluid seals 35c and 35d are provided between the secondary seal 35 and the primary seal support 31 and the space intermediate such seals is vented to the low pressure side of the valve by one or more radial ports 31f provided in the primary seal support 31. By virtue of the provision of seals 35c, 35d and 32b, it will be apparent that both the primary seal support 31 and the secondary seal 35 are individually pressure biased into sealing engagement with the surface of the ball 20 by the fluid pressure which inherently builds up within the fluid passage 10a when the ball 20 is in its closed position. It is, therefore, assured that the described rotary valve, in its closed position, will be essentially leak-free due to the fact that both the elastomeric seal 34 and the metallic sealing face 35 are held snugly in engagement with the surface of ball 20 by the fluid pressure and, of course, the greater the fluid pressure differential across the valve, the tighter will be the engagement of the seals with the ball surface.

An annular actuator 40 is provided which may be generally described as having a cage-like configuration. Thus, the actuator 40 includes a ring-shaped portion 40a disposed on the upstream side of the ball 20 and having an end face 40b abutting an outwardly projecting end face 31g provided on the primary valve support 31. A second ring-shaped portion 40c is disposed on the downstream side of the ball 20 and is connected to portion 40a by a plurality of circumferentially spaced, axially extending bar portions 40d. Obviously, the bar portions 40d straddle the pinion bearings 11. It is, therefore, clear that the actuating cage 40 may be axially reciprocated within the tubular housing 10 between its position illustrated in FIG. 1a, which corresponds to the closed position of the ball 20, and its position in FIG. 1d, illustrating the position of the actuator cage 40 when the ball 20 is rotated to its open position.

An internally projecting radial pin 40e is provided on one of the bars 40d of the actuating cage 40 to impart a rotary movement of the ball 20 about the trunnion bearings 11, from its closed position shown in FIG. 1a to its open position shown in FIG. 1d. The rotating pin 40e cooperates with a cam slot in the surface of the ball 20. Such slot cannot be conveniently shown in the schematic views of FIGS. 1a through 1d, but appears as the slot 23 in FIG. 5. The slot 23 is proportioned so as to permit the actuating cage 40 to move a significant axial distance before any rotational movement is imparted to the ball 20.

Figure 1B:
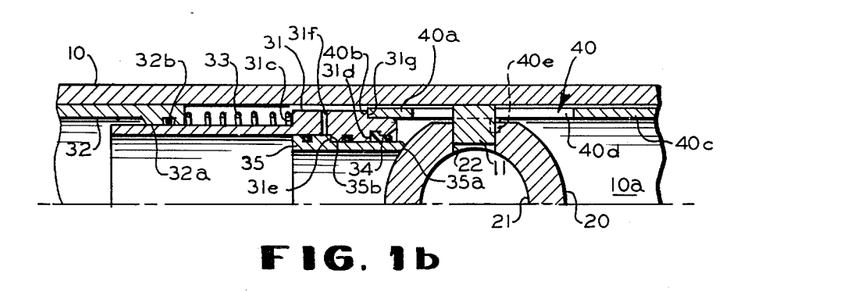
FIGS. 1b, 1c and 1d are views similar to FIG. 1a but showing the elements of the valve in the positions during the valve opening sequence.
Figure 1C:
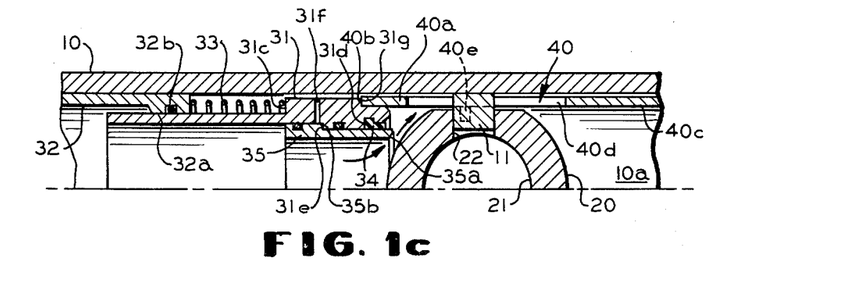
Figure 1D:
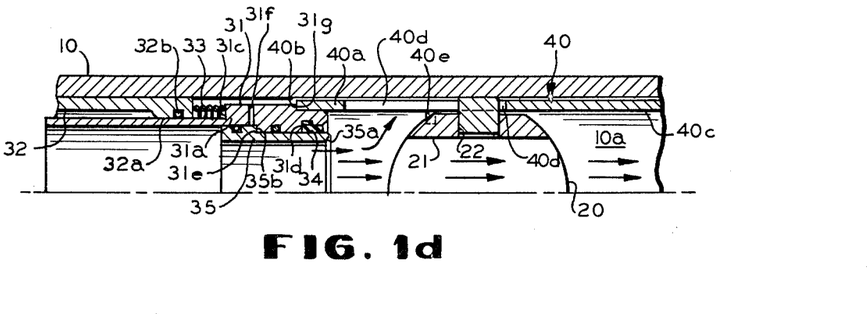

Thus, referring specifically to FIG. 1b, the initial axial movement of the actuating cage 40 in an upstream direction first effects the axial shifting of the primary seal support 31 to remove the elastomeric seal 34 from engagement with the surface of the ball 20 and compress the spring 33. Next, as illustrated in FIG. 1c, further axial movement of the actuating cage 40 effects the removal of the secondary metallic seal 35 from engagement with the surface of the ball 20 through the interengagement of the shoulders 31e and 35b. Limited flow then occurs around the periphery of the ball valve 20 but such flow will have no eroding effects on the elastomeric seal 34 which is safely disposed behind the secondary seal 35.

Further axial movement in the upstream direction of the actuating cage 40 then effects the rotation of the ball 20 to its open position shown in FIG. 1d through the cooperation of the internally projecting rotating pin 40e with the cam slot 23 provided in the ball surface.

The closing of the described rotary ball valve is accomplished by reversal of the opening steps heretofore described. Thus, the axial movement of the actuating cage 40 in a downstream direction under the bias of the spring 33 first produces a rotation of the ball 20 to the position shown in FIG. 1c while both the primary elastomeric seal 34 and the secondary seal 35 are out of engagement with the ball surface. The flow of the pressurized fluid is then around the periphery of the ball 20 and its supporting trunnion bearings 11. Such flow is substantially reduced by further axial movement of the actuating cage 40 in a downstream direction to the position shown in FIG. 1b which causes the annular metallic seal element 35 to move into contact with the surface of the ball 20, thus effectively cutting off all significant flow of the high pressure fluid past the sealing surface 35a. Lastly, the final axial movement of the actuating cage 40 in a downstream direction to the position shown in FIG. 1a will permit the primary seal support 31 to move toward the ball 20 to bring the elastomeric seal 34 into engagement with the ball surface. Primary seal support 31 is urged to move in such direction through the combined bias of the spring 33 and the pressure, which has built up in the conduit 10a due to the closing of the ball 20, acting on the end faces of the primary valve support 31 and the secondary valve 35.

From the foregoing description, it is apparent that this invention provides a unique method and apparatus for periodically interrupting the flow of high pressure fluid through a conduit. While rotary ball valves have heretofore been known which employ the combination of both an elastomeric and a metal sealing element, the described construction, plus its method of operation, function to reduce the pressure differential across the elastomeric seal at all times to a value substantially below the shear strength of the elastomeric material. At no time is the elastomeric seal exposed to high volume, high pressure flow of fluid with the attendant deleterious erosion effects. The metal sealing element does not have to be one hundred percent effective, it can permit a moderate degree of leakage, but such moderate leakage will have no adverse effects on the elastomeric material of the primary seal structure. More importantly, the fact that both the metallic and the elastomeric seal are removed from contact with the ball surface prior to any rotational movement of the ball, insures that a minimum torque will be required to shift the ball from its closed to its open position, and vice versa, because the only forces acting on the ball during rotation are those produced by the fluid flow around the ball. Most of these forces are readily absorbed by the trunnion bearings 11. Therefore, not only is the life of both the elastomeric seal and the metallic sealing elements substantially increased, but the valve rotating mechanism is protected from any damage due to development of excessive torque in opening the valve.

The actuating cage 40 not only effects the axial movement of the primary and secondary seals away from the ball but it also then effects the rotation of the ball. Due to the fact that all such movements are performed by a single moving element, there is no opportunity for any of the movements to be performed out of the desired sequence.

A number of well known expedients can be employed to effect the axial movement of the actuating cage. Such movement can be produced, for example, by a relative axial movement of the housing 10 with respect to the cage 40, by a relative rotational movement of the cage 40 and a sleeve journaled in the housing, which results in a relative axial movement of the cage 40 through the employment of cooperating screw threads or the like, or a hydraulic device can be incorporated within housing 10 to effect the axial movement of the cage 40 relative thereto.

Figure 2A:
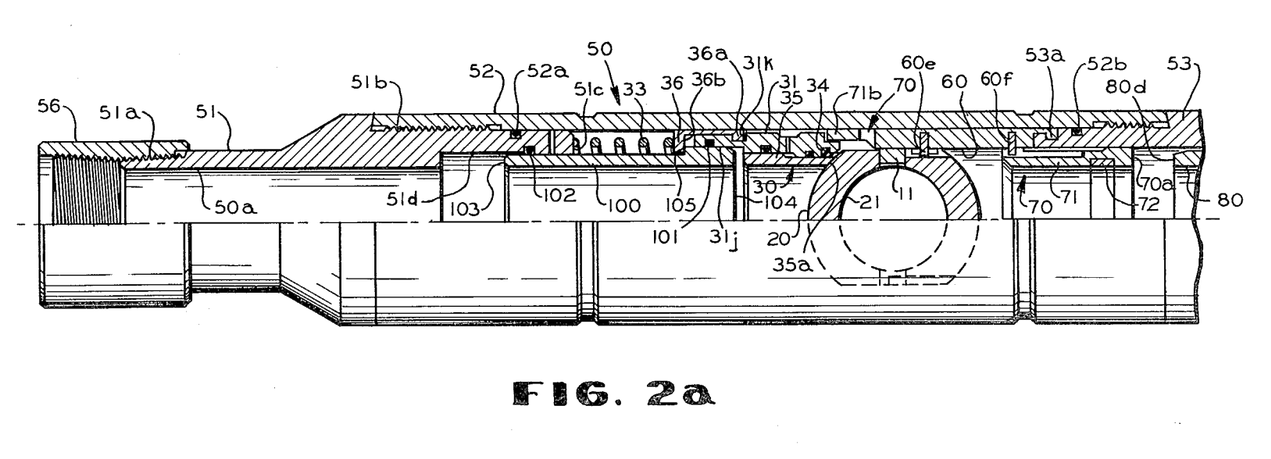
FIGS. 2a and 2b constitute an elevational view, partly in section of a preferred form of rotary ball valve embodying this invention, with the ball valve disposed in its closed position.
Figure 2B:
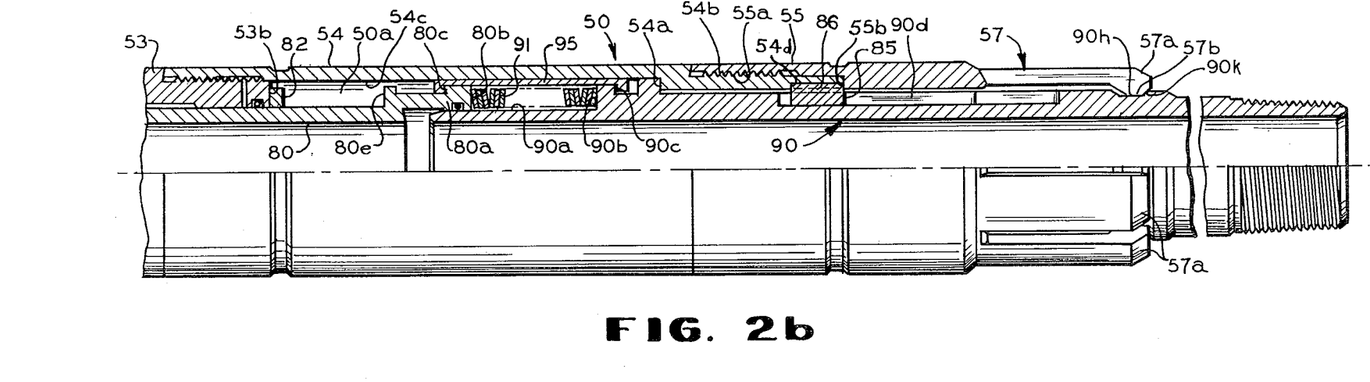

Referring now to FIGS. 2a through 2b, there is shown in complete detail a commercial embodiment of a rotary valve incorporating this invention which is designed for use as a downhole valve in an oil well. Such valve is advantageously employed as a surge or stimulation valve. It could also be employed as a safety valve, an injection control valve or to accomplish several other well known functions of a downhole tubing valve in an oil well.

The valve housing 50 comprises a plurality of threadably interconnected sections 51, 52, 53, 54, and 55. All of such sections are of tubular configuration and define an axial passage 50a extending through the entire length of the housing 50.

The housing section 51 constitutes a reduction coupling having a threaded small end portion 51a to receive an internally threaded sleeve 56 by which the housing 50 can be connected to the end of a tubing string or an initially coiled tubing to support the housing 50 within the well. The other larger end 51b of the reduction coupling 51 is threadably connected to a cylindrical valve housing section 52 of the housing 50 (corresponding to the element 10 in FIGS. 1a through 1d), and a seal 52a is provided to prevent leakage through the threaded connection.

The other end of the valve housing section 52 is connected to the externally threaded end of a coupling section 53 and a seal 52b prevents fluid leakage through the threaded connection between the valve housing section 52 and the coupling section 53.

The other end of the coupling section 53 is connected to a generally cylindrical extension section 54 having an internally projecting shoulder 54a at its other extremity and external threads 54b which cooperate with internal threads 55a on a positional control section 55.

A ball support structure 60 is secured within a right-hand end portion (FIG. 2a) of the valve housing section 52. The support 60 comprises an assemblage of two semi-annular elements 60a and 60b which are best shown in the exploded view of FIG. 5. Each element 60a and 60b comprises a semi-annular ring element 60c to which is integrally secured within an axially extending arm 60d. On the end of each arm 60d, a trunnion bearing pin 11 is suitably mounted. Each pin 11 cooperates with a bearing hole 22 provided in the ball 20 and journals such ball for rotation between a closed position illustrated in FIG. 2a, wherein the ball fluid passage 21 is disposed with its axis perpendicular to the longitudinal fluid passage 50a of the housing 50, and an open position illustrated in FIG. 3a, wherein the ball fluid passage 21 is aligned with the housing passage 50a. Additionally, at least one of the arms 60d of the bearing support structure 60 is provided with an internally projecting pin 60e which cooperates with an arcuate slot 24 provided in the surface of the ball 20 to effectively limit the rotational movement of the ball 20 to 90° degrees, which is exactly the angular displacement required to shift the ball 20 between its open and closed positions. This prevents accidental overrun of the ball beyond either the open or closed position.

The bearing support structure 60 is made in two semi-annular pieces to facilitate the assembly of the ball on the bearing trunnions 11. The two halves 60a and 60b of the ball support structure 60 can be respectively assembled onto the ball 20 and concurrently the semi-annular portions 60c snapped into snug engagement with a groove 53a provided in the end of the coupling section 53, following which coupling section 53 with ball support structure 60 and the ball 20 assembled thereto can be readily assembled in the valve housing section 52 of the housing 50.

The seal structure 30 is substantially identical to that previously described in connection with FIGS. 1a through 1d, and is mounted on the upstream side of the ball 20 within the valve housing section 52. The seal spring 33 now operates between the end face 51c of the reduction section 51 and a generally U-shaped, split guide ring 36 which surrounds the upstream end of the primary valve support 31 and has an internally projecting flange 36a cooperating with an external slot 31k provided on primary valve support 31.

The actuating element corresponding to the cage 40 of FIGS. 1a through 1d is an annular structure 70. To permit the assemblage of the actuating cage 70 within the housing 50, such cage is constructed by the abutting connection of two semi-annular components. Thus, referring to FIG. 5, the cage 70 comprises substantially identical semi-annular components 71. Each component 71 comprises a solid, generally semi-annular element 71a that is disposed on the downstream side of the ball 20, plus a plurality of integral, peripherally spaced, axially extending bar portions 71c connecting with a second semi-cylindrical solid portion 71b that is disposed on the upstream side of the ball 20. Obviously, the bar portions 71c are assembled in straddling relationship to the inwardly projecting trunnions 11 of the bearing support element 60. The inwardly projecting ball rotating pin 40e is mounted on one of the bar portions 71c and engages the ball slot 23.

To prevent relative rotation between the bearing support structure 60 and the actuating cage structure 70, a lug 60f projects inwardly from the arm portion 60b of the ball support structure 60 to lie between two of the rods 71c of the actuating cage 70. Like the support structure 60, the two semi-annular components 71 of the actuating cage 70 are assembled separately around the ball 20 and bearing support structure 60 and the two semi-annular components are held in assembled abutting relationship by an internal ring 72.

The cooperation of the actuating cage 70 with the ball 20 and the seal structures 30 is exactly the same as previously described for the actuating cage 40 in the schematic views of FIGS. 1a through 1d. Thus, initial axially upstream movement of the actuating cage 70 relative to the ball 20 effects a shifting of the seal structure 30 away from the ball in the desired sequence, namely, the elastomeric seal 34 is first shifted axially away from the ball, followed by an axial shifting of the metallic secondary seal 35. After both the primary and secondary seals are moved from contact with the ball, the internally projecting ball rotating pin 40e on the actuating cage 70 contacts the wall of the ball cam slot 23 to rotate the ball exactly 90° to its open position.

Figure 3A:
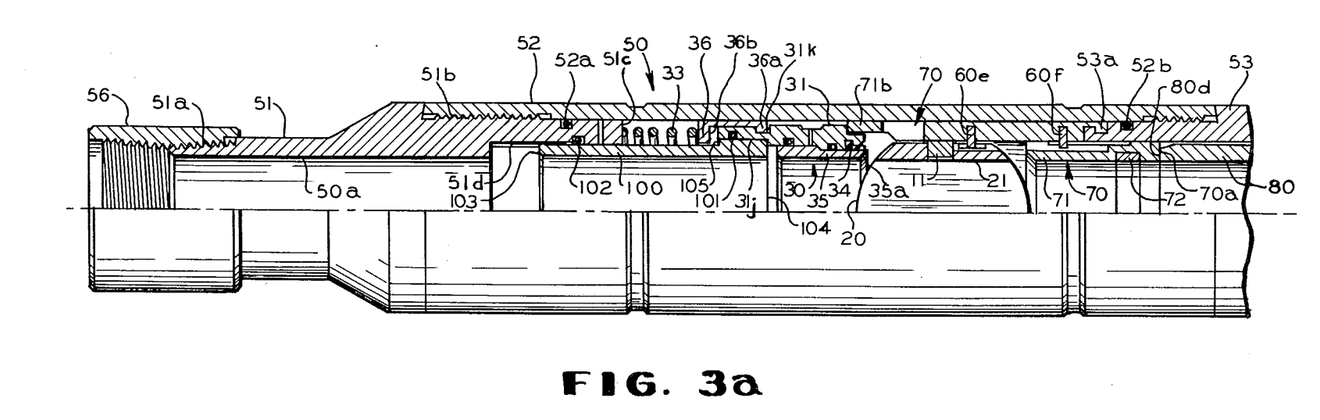
FIGS. 3a and 3b are views similar to FIGS. 2a and 2b but illustrating the ball valve disposed in its open position.
Figure 3B:
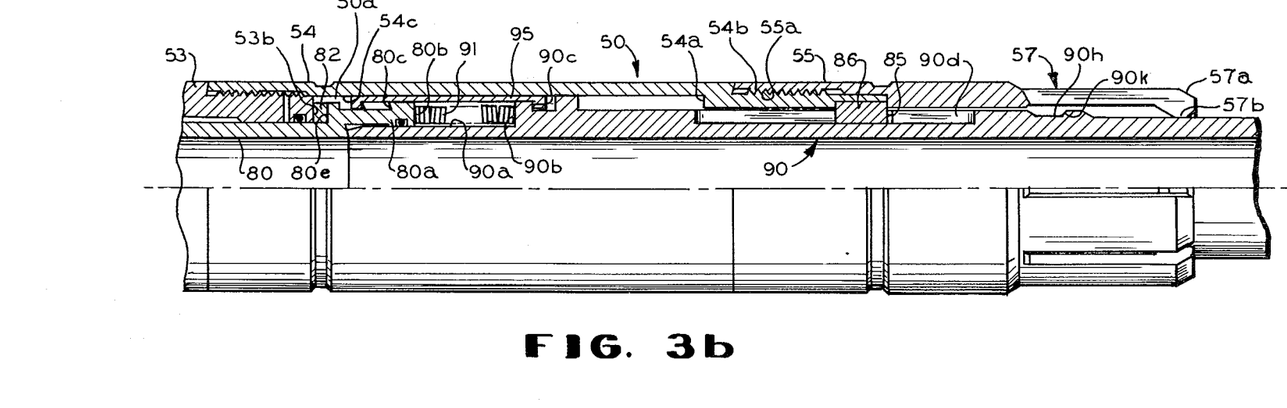

As illustrated in FIGS. 3a and 3b of the drawings, the actuating cage 70 is axially shifted relative to the housing 50, hence relative to the ball 20, by downstream axial movement of the housing 50 with respect to a tubular mandrel 80. The mandrel 80 is supported for limited axial sliding movement by engagement of the inner wall of its lower end portion 80a with a cylindrical external surface 90a of "J" slot mandrel 90, which is attached to the top of any element that is rigidly mounted within the well, such as a packer or anchor.

Resilient means are provided for resisting downward movement of the mandrel 80 relative to the "J" slot mandrel 90 comprising a stack of Bellville spring washers 91 operating between the end face 80b of the mandrel 80 and a radial shoulder 90b provided on the "J" slot mandrel 90. To maintain the mandrel 80 in its assembled relationship with the "J" slot mandrel 90, a split-ring retaining element 95 is provided which is of generally U-shaped configuration in cross-section and respectively engages an upwardly facing shoulder 80c provided on the mandrel 80 and a downwardly facing shoulder 90c provided on the "J" slot mandrel 90. The two halves of the split-ring 95 are held in assembled relationship by the interior wall 54c of the housing extension 54. This downward movement of the housing 50, which can be produced at the well head by lowering the tubing, moves the ball valve support structure 60 and the actuating cage 70 downwardly. The bottom end face 70a of the actuating cage 70 engages the top end face 80d of the mandrel 80 and effects an axial displacement of the actuating cage 70 relative to the ball 20, hence relative to the seal structure 30. The sequential operation of the primary elastomeric seal 34 and the secondary seal 35, followed by rotation of the ball 20 to its open position occurs in the same manner as previously described in connection with the schematic views of FIGS. 1a through 1d. Additionally, imposition of a downward force on the end face 80d of the mandrel 80 effects a compression of the Bellville spring assemblage 91, thus assuring the return of the mandrel 80 to its position shown in FIGS. 2a and 2b whenever the housing 50 is axially shifted in the reverse, or upward direction.

Figure 4A:
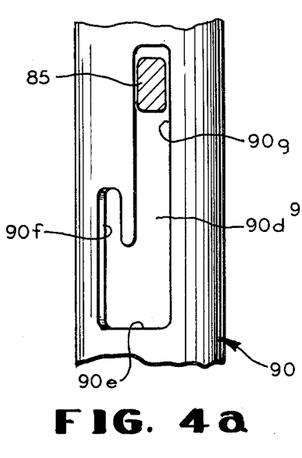
FIGS. 4a, 4b and 4c each constitute fragmentary sectional views of a portion of the rotary valve of FIGS. 2a and 2b illustrating the successive positions of the locking lug with respect to a cooperating J-slot.
Figure 4B:
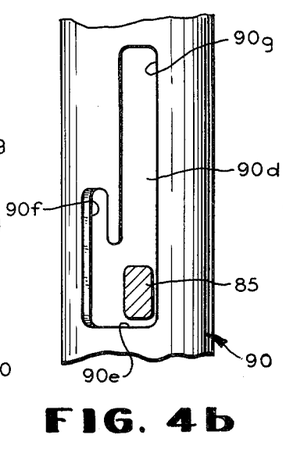
Figure 4C:
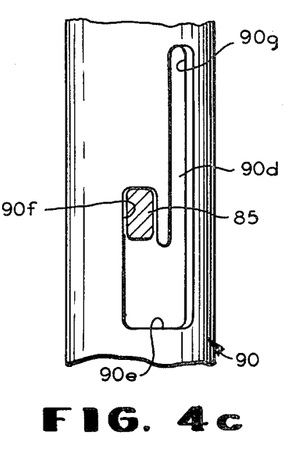
Figure 5:
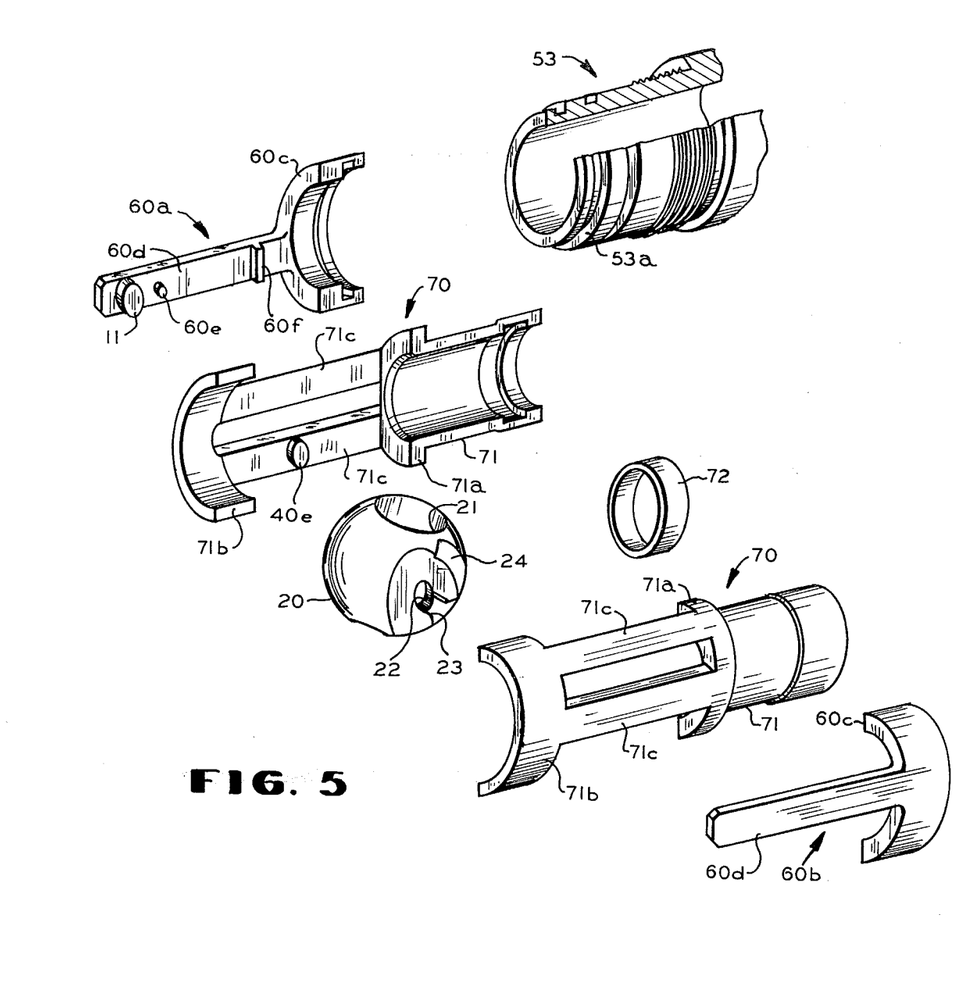
FIG. 5 is an exploded perspective view illustrating the detailed construction of the ball supporting and actuating components of the rotary valve of FIGS. 2a and 2b.
Figure 6:
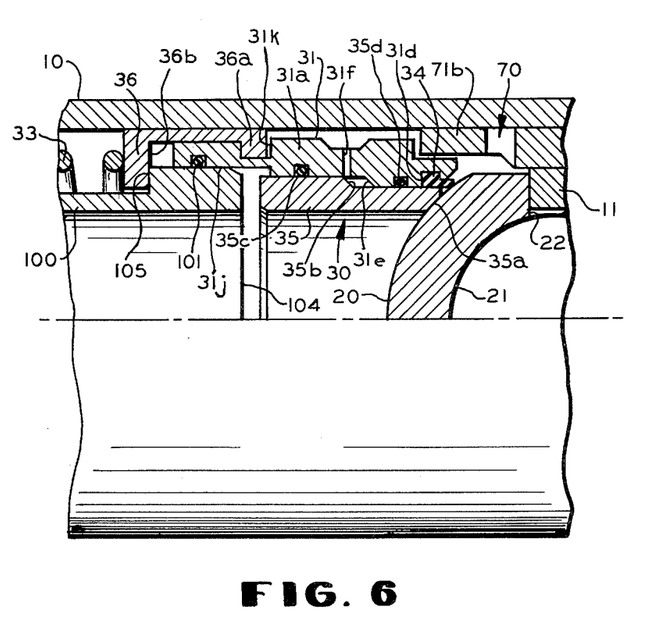

Under some conditions it may be desirable to mechanically override the valve and lock the valve with the ball 20 in its open position for the purpose of running a wire line through the valve, running other equipment therethrough, or to test the tubing. Under these conditions it is only necessary to rotate the housing 50 a quarter of a turn from its open position to lock the valve in the open position through the cooperation of a locking lug 85 with a "J" slot 90d. The "J" slot 90d is provided in the wall of the "J" slot mandrel 90 and receives the inwardly projecting lug 85. The lug 85 can be formed as an internal projection on a ring 86 which is clamped between an end face 54d of the extension housing 54 and an internal shoulder 55b provided on the positional control housing 55. The slot 90d is of J- shaped configuration, as best shown in FIGS. 4a through 4c, and after the lug 85 is moved to the bottom of the J-shaped slot by the axially downward movement of the housing 50 relative to the "J" slot mandrel 90, rotation of the housing 50, which may be applied at the well head to the connected tubing, effects the angular displacement of the lug 85 into the horizontal portions 90e of the J-shaped slot, whereupon release of the downward force on housing 50 will cause the lug 85 to rise into the short vertical leg 90f of J-shaped slot 90d. The housing 50 is thus locked to the "J" slot mandrel 90 and the ball 20 is locked in open position and will remain in such locked position until a downward movement of the housing 50, followed by a reverse rotational movement of the housing 50, permits the locking lug 85 to become disengaged from the short leg 90f of the "J" slot 90d, and enter the long leg 90g permitting the housing 50 to be raised relative to actuating cage 70, and ball valve 20 closed.

To facilitate rotation of the housing 50 relative to the "J" slot mandrel 90, an annular thrust bearing 82 surrounds mandrel 80 and abuts an upwardly facing shoulder 80e. The lower end face 53b of housing coupling section 53 rests on thrust bearing 82 when housing 50 reaches its lower open position.

In some applications, it is desirable that the rotary valve assemblage be lowered into the well with the ball locked in its closed position. To accomplish this, a collet section 57 is provided at the lower end of positional control housing section 55. Collet section 57 comprises axially extending, circumferentially spaced spring fingers 57a, each of which has an inwardly projecting portion 57b which engage in a groove 90h provided on the surface of "J" slot mandrel 90. Thus, as the assembly is initially lowered into the well, it is assured that accidental bumping of the end of the "J" slot mandrel 90 against the well casing will not initiate the opening sequence of movements of the ball 20. Downward motion of the housing 50 is effectively resisted by the inclined lower wall 90k of the groove 90h until the "J" slot mandrel 90 is firmly established in its mounting at the bottom of the well, whereupon sufficient weight can be imposed on the "J" slot mandrel 90 by the supporting tubing to insure that the collet fingers 57a will ride over the shoulder 90k and thus permit the normal operating sequence for opening the valve to occur.

A further modification of this invention is illustrated in FIGS. 2a and 3a. In some instances, and particularly under emergency conditions, it may be desirable to reverse the direction of fluid flow through passageway 50a and then open the ball 20. If this occurred, the sealing structure 30 would normally not be held by the spring 33 in engagement with the surface of the ball 20 since a greater component of force due to the reversed fluid pressure would force it away from the surface of the ball 20. To counteract this condition, there is provided an annular actuating piston 100 on the upstream side of the valve. The piston 100 is slidably mounted between an internal surface 51d of the coupling 51 and the internal surface 31j of the tubular portion 31b of the primary valve support 31. Seal 101 is provided between the annular actuating piston 100 and the primary support 31 and a seal 102 is provided between the annular piston 100 and the interior wall 51d of coupling 51. The upper end face 103 of annular piston 100 is of substantially smaller diameter than the downstream end face 104 and hence, under normal operating conditions, when the high pressure side of the valve assemblage is on the left side of ball 20, as viewed in the drawings, the actuating piston 100 is urged axially to the left, or upstream, and such movement is limited by the engagement of the external shoulder 105 on the annular piston with the internally projecting shoulder 36b of the split ring 36. The differential pressure generated by the annular piston 100 is not, however, sufficient to overcome the combined effects of the fluid pressure on the seal structure 30 and the bias of the spring 33 so that the piston 100 is not a factor in the normal operation of the valve.

When, however, fluid flow is reversed through the valve so that high pressure exists to the right of the ball 20 as viewed in the drawings, a pressure differential then exists on the annular piston 100 urging it downhole or to the right as viewed in FIG. 2a, and hence bringing its end face 104 into engagement with the secondary seal 35 to hold it in engagement with the ball 20. As the pressure differential builds up across the seal, the primary elastomeric sealing member 34 is moved out of contact with the surface of the ball 20 against the force of the biasing spring 33 until a shoulder 31e on the primary seal support 31 engages the shoulder 35b on the secondary seal 35 and then the secondary seal 35 is moved out of engagement with the ball. Thus the desired sequence of operation of the primary and secondary seals is retained during the opening of the valve even under conditions of reverse flow through the valve.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. The method for opening a rotary valve of the type having an apertured ball journalled for rotational movement in a fluid passage and, in its closed position, being sealingly engaged by a pair of concentric annular sealing members, one of said sealing members being formed from an elastomeric material, comprising the steps of:
(a) axially shifting the one annular sealing member relative to the ball to disengage from the ball while the ball is in its closed position and the other annular sealing member remains in fully sealed engagement with the ball; (b) then axially shifting the other of the annular sealing elements relative to the ball to disengage from the ball so that rotation of the ball is resisted solely by the fluid stream in the passage; and (c) rotating the ball to an open position wherein the ball aperture is aligned with the fluid passage.

2. The method of operating a rotary valve of the type having an apertured ball journalled for rotational movement in a fluid passage and, in its closed position, being sealingly engaged by a pair of concentric annular sealing members, one of said sealing members being formed from an elastomeric material, comprising the steps of:
(a) axially shifting the one annular sealing member relative to the ball to disengage from the ball while the ball is in its closed position and the other annular sealing member remains in fully sealed engagement with the ball; (b) then axially shifting the other of the annular sealing elements relative to the ball to disengage from the ball so that rotation of the ball is resisted solely by the fluid stream in the passage; (c) rotating the ball to an open position wherein the ball aperture is aligned with the fluid passage; and (d) closing the valve by reversing steps (c), (b) and (a), in that sequence.

* * * * *